United States Patent
Ragle et al.

(10) Patent No.: US 8,071,504 B2
(45) Date of Patent: Dec. 6, 2011

(54) EXHAUST SYSTEM HAVING A GOLD-PLATINUM GROUP METAL CATALYST

(75) Inventors: Christie Susan Ragle, Havana, IL (US); Ronald G. Silver, Peoria, IL (US); Svetlana Mikhailovna Zemskova, Edelstein, IL (US); Colleen J. Eckstein, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 236 days.

(21) Appl. No.: 12/318,002

(22) Filed: Dec. 19, 2008

(65) Prior Publication Data
US 2010/0158779 A1 Jun. 24, 2010

(51) Int. Cl.
*B01J 23/00* (2006.01)
*B01J 23/42* (2006.01)
*B01J 23/44* (2006.01)
*B01J 23/58* (2006.01)
*B01D 50/00* (2006.01)
*B01D 53/34* (2006.01)

(52) U.S. Cl. ........ 502/333; 502/330; 502/339; 502/350; 422/177; 422/180

(58) Field of Classification Search .................. 502/243, 502/262, 330, 332, 333, 339, 349, 350, 355, 502/415, 439; 422/177, 180
See application file for complete search history.

(56) References Cited

U.S. PATENT DOCUMENTS

| | | | |
|---|---|---|---|
| 4,552,860 A * | 11/1985 | Murib | 502/242 |
| 4,759,918 A | 7/1988 | Homeier et al. | |
| 4,902,487 A | 2/1990 | Cooper et al. | |
| 5,100,632 A | 3/1992 | Dettling et al. | |
| 5,106,802 A * | 4/1992 | Horiuchi et al. | 502/65 |
| 5,208,203 A * | 5/1993 | Horiuchi et al. | 502/302 |
| 5,258,349 A * | 11/1993 | Dalla Betta et al. | 502/330 |
| 5,326,253 A * | 7/1994 | Dalla Betta et al. | 431/7 |
| 5,511,972 A * | 4/1996 | Dalla Betta et al. | 431/170 |
| 5,587,137 A | 12/1996 | Swaroop et al. | |
| 5,589,432 A * | 12/1996 | Yoshida et al. | 502/325 |
| 5,670,443 A * | 9/1997 | Irite et al. | 502/330 |
| 5,670,444 A * | 9/1997 | Yoshida et al. | 502/331 |
| 5,700,753 A | 12/1997 | Wang et al. | |
| 5,741,468 A * | 4/1998 | Saito et al. | 423/239.1 |
| 5,801,114 A * | 9/1998 | Durand et al. | 502/302 |
| 5,808,136 A * | 9/1998 | Tacke et al. | 560/243 |
| 5,824,621 A * | 10/1998 | Abe et al. | 502/305 |
| 5,882,607 A * | 3/1999 | Miyadera et al. | 422/177 |
| 5,884,473 A | 3/1999 | Noda et al. | |
| 5,885,923 A * | 3/1999 | Yoshida et al. | 502/312 |
| 5,989,507 A | 11/1999 | Sung et al. | |
| 6,500,392 B2 | 12/2002 | Mizuno et al. | |
| 6,685,900 B2 | 2/2004 | Domesle et al. | |
| 6,916,450 B2 | 7/2005 | Akama et al. | |
| 7,094,730 B2 * | 8/2006 | LaBarge et al. | 502/332 |
| 7,109,145 B2 * | 9/2006 | Ruth et al. | 502/326 |
| 7,138,353 B2 * | 11/2006 | Takeshima et al. | 502/64 |
| 7,541,006 B2 * | 6/2009 | Yoshida | 422/180 |
| 7,601,670 B2 * | 10/2009 | Yasuda et al. | 502/326 |
| 7,611,680 B2 * | 11/2009 | Jia et al. | 422/177 |

(Continued)

*Primary Examiner* — Cam N. Nguyen
(74) *Attorney, Agent, or Firm* — Finnegan, Henderson, Farabow, Garrett & Dunner LLP

(57) ABSTRACT

A method of providing an exhaust treatment device is disclosed. The method includes applying a catalyst including gold and a platinum group metal to a particulate filter. The concentration of the gold and the platinum group metal is sufficient to enable oxidation of carbon monoxide and nitric oxide.

11 Claims, 1 Drawing Sheet

U.S. PATENT DOCUMENTS

| | | | |
|---|---|---|---|
| 7,678,347 B2 * | 3/2010 | Chen | 422/180 |
| 7,727,931 B2 * | 6/2010 | Brey et al. | 502/344 |
| 7,824,639 B2 * | 11/2010 | Moroz et al. | 423/246 |
| 2005/0197244 A1 | 9/2005 | L'vovich et al. | |
| 2005/0271572 A1 | 12/2005 | Benderly | |
| 2008/0045405 A1 | 2/2008 | Beutel et al. | |

\* cited by examiner

EXHAUST SYSTEM HAVING A GOLD-PLATINUM GROUP METAL CATALYST

GOVERNMENT RIGHTS

This invention was made with Government support under the terms of the Oxidation CRADA, Contract No. PNNL230 awarded by the Department of Energy. The Government may have certain rights in this invention.

TECHNICAL FIELD

The present disclosure relates generally to an exhaust system and, more particularly, to an exhaust system having a gold-platinum group metal catalyst.

BACKGROUND

Internal combustion engines such as, for example, diesel engines, gasoline engines, natural gas engines, and other engines known in the art, exhaust a complex mixture of chemical pollutants. The chemical pollutants may include solid particulate matter, including hydrocarbon, and gaseous compounds, which may include nitrogen oxides (NOx) and carbon monoxide (CO). Due to increased attention on the environment, exhaust emission standards have become more stringent, and the amount of pollutants emitted to the atmosphere from an engine may be regulated depending on the type of engine, size of engine, and/or class of engine.

One method that has been implemented by engine manufacturers to comply with the regulation of particulate matter exhausted to the environment has been to remove the matter from the exhaust flow of an engine with particulate filters. However, over time the particulate matter builds up in the filter medium, thereby reducing functionality of the filter and subsequent engine performance. To reduce the buildup of particulate matter and return functionality to the filter and engine, the particulate trap is periodically regenerated. Regeneration involves oxidizing, or combusting, the particulate matter, and is often achieved by increasing the temperature within the particulate filter with a fuel powered burner or an electrical grid. Although this method is generally successful, the combustion of the particulate matter, particularly hydrocarbon, in oxygen requires high combustion temperatures of approximately 600-700° C. Because these temperatures typically exceed the operating temperature of a diesel engine, in order to improve regeneration, it may be desirable to reduce the temperature at which the hydrocarbon combusts.

One method of reducing the combustion temperature of particulate matter is disclosed in U.S. Pat. No. 4,902,487 (the '478 patent), issued to Cooper et al. The '478 patent discloses a method of providing nitrogen dioxide ($NO_2$) to the particulate matter in order to reduce the combustion temperature of the particulate matter. The method includes passing exhaust gas through a catalyst coated with platinum or another platinum group metal, so that nitric oxide (NO) in the exhaust gas is catalytically converted to $NO_2$. The $NO_2$ is fed to the particulate filter where the particulate matter is combusted in a temperature range of 250-400° C.

Although the method of the '478 patent may reduce the combustion temperature of particulate matter, the temperature range required for regeneration may still exceed the operating temperature of the engine. In order to improve regeneration, it may be desirable to further reduce the combustion temperature.

The disclosed exhaust system is directed to overcoming one or more of the shortcomings set forth above and/or other shortcomings in the art.

SUMMARY

In one aspect, the present disclosure is directed to a method of providing an exhaust treatment device. The method includes applying a catalyst including gold and a platinum group metal to a particulate filter. The concentration of the gold and the platinum group metal is sufficient to enable oxidation of carbon monoxide and nitric oxide.

In another aspect, the present disclosure is directed to an exhaust treatment device. The exhaust treatment device includes a gold-platinum group metal catalyst configured to increase a concentration of nitrogen dioxide, decrease a concentration of carbon monoxide, and reduce an oxidation temperature of hydrocarbon.

In yet another aspect, the present disclosure is directed to a method of operating an exhaust treatment device. The method includes exposing a flow of exhaust to a gold-platinum group metal catalyst and decreasing a concentration of carbon monoxide within an exhaust stream. The method may also include increasing a concentration of nitrogen dioxide within an exhaust stream and oxidizing hydrocarbon within an exhaust stream.

DETAILED DESCRIPTION

Figure 1:
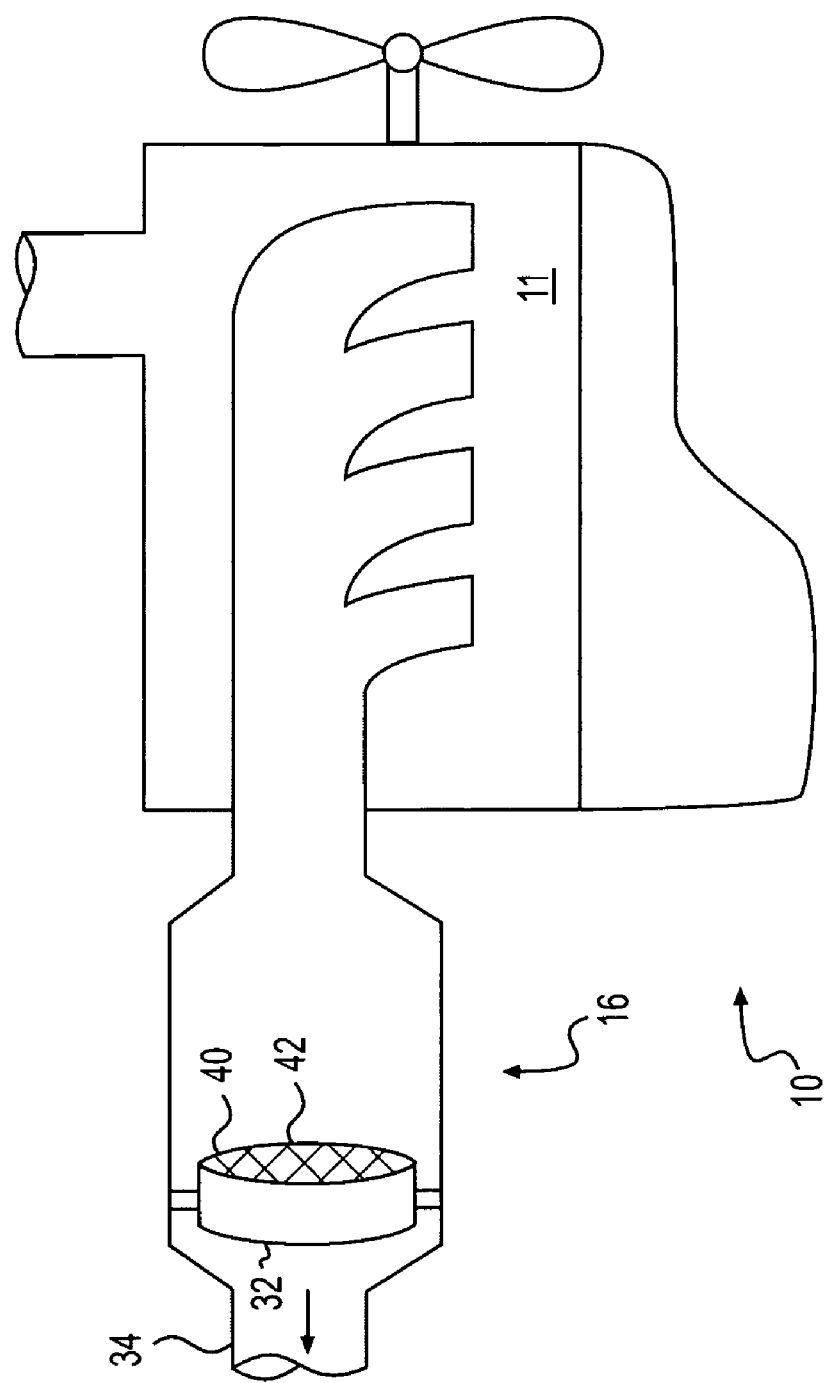
FIG. 1 is a diagrammatic illustration of a power source having an exhaust system according to an exemplary disclosed embodiment.

FIG. 1 illustrates an exemplary power source 10. The power source 10 may include an engine 11 such as, for example, a diesel engine, a gasoline engine, a gaseous fuel-powered engine, or any other engine known in the art. The power source 10 may, alternatively, include a non-engine source of power such as a furnace. The power source 10 may include an exhaust system 16 that directs exhaust away from the engine 11.

The exhaust system 16 may include components that direct and/or treat exhaust from the engine 11. In particular, the exhaust system 16 may include a filter system 32 and an exhaust outlet 34. The exhaust from the engine 11 may pass through the filter system 32 to the exhaust outlet 34 before discharge to the atmosphere. It is contemplated that additional emission-controlling devices may be included within the exhaust system 16, if desired.

The filter system 32 may be placed downstream of the engine 11 to remove particulates, including hydrocarbon, from the exhaust and catalyze gaseous compounds. The filter system 32 may include a particulate filter 40 and a catalyst 42.

The particulate filter 40 may remove particulate matter from the exhaust. The particulate filter 40 may include, for example, a foam material. The foam material may be formed from sintered metallic particles such as, for example, alumina, titania, or any other high-temperature alloy. The foam material may also be formed from ceramic particles such as, for example, silicon carbide, cordierite, mullite, or any other ceramic particles known in the art. The foam material may be formed into a filter medium through a casting process, an injection molding process, or any other process that produces a porous material with a desired porosity. Alternatively, the filter 40 may include a monolith substrate in which the exhaust is forced through the walls of the substrate by alternatively blocking inlet and exit channels, in a manner known in the art. The monolith substrate may be formed from ceramic material such as cordierite, or from a suitable metal.

The catalyst 42 may be incorporated throughout the particulate filter 40 and may be configured to oxidize CO and NOx to enable low temperature combustion of hydrocarbon within the particulate filter 40. The catalyst 42 may be a gold and platinum group metal alloy. The platinum group alloy may be, for example, ruthenium, rhodium, palladium, osmium, iridium, or platinum. The catalyst 42 may be applied as a wash coating to the particulate filter 40 or incorporated into the filter material in any other manner known in the art. The catalyst 42 may be, for example, gold-palladium (Au—Pd) with a composition of between about 0.08% and 1.2% Au and between about 0.4% and 0.6% Pd, by weight, on a titania ($TiO_2$) support. For example, catalyst 42 comprise between about 0.9% and about 1.1% Au and between about 0.45% Pd and about 0.55% Pd by weight, such as about 1.0% Au and about 0.5% Pd. The catalyst 42 may enable low temperature combustion of hydrocarbon by achieving lightoff, that is, oxidation of about 50% of the CO present, at a temperature of about 60° C. The catalyst 42 may also oxidize NOx to form $NO_2$, and may achieve lightoff of NOx at about 230° C. By reducing the concentration of CO in the exhaust gas and increasing the concentration of $NO_2$, the catalyst 42 may enable the hydrocarbon within the particulate filter to combust at about 206° C.

INDUSTRIAL APPLICABILITY

The disclosed exhaust treatment system may be applicable to any combustion-type device, such as an engine or a furnace, where the combustion of hydrocarbon within an exhaust stream thereof is desired. The disclosed exhaust treatment system may reduce a concentration of CO in an exhaust stream, while increasing a concentration of $NO_2$. The resultant gas may facilitate combustion of hydrocarbon at reduced temperatures, and improve particulate filter regeneration. Operation of the exhaust treatment system 16 will now be explained.

Atmospheric air may be drawn into a combustion chamber of the engine 11. Fuel may be mixed with the air before or after entering the combustion chamber. This fuel-air mixture may be combusted by the engine 11 to produce mechanical work and an exhaust flow including hydrocarbon, CO, NOx, and other solid and gaseous compounds.

The exhaust gas flow may be directed to the filter system 32 where hydrocarbon and other particulate matter entrained with the exhaust flow may be filtered by the particulate filter 40. As the exhaust gas passes through the particulate filter 40, CO and NOx gases may be exposed to the catalyst 42. The catalyst 42 may be composed of gold-palladium and may oxidize CO and NOx present in the exhaust to form $CO_2$ and $NO_2$, respectively.

The gold-palladium catalyst 42 may be more efficient than using either a gold or a palladium catalyst alone, as is typically done. Specifically, the gold-palladium catalyst may achieve a CO to $CO_2$ conversion at temperatures lower than those possible with gold alone. For example, the gold-palladium catalyst 42 may convert 90% of the CO present in the exhaust to $CO_2$ at about 84° C., where as a gold catalyst alone may require a temperature of about 105° C. to convert the same amount of $CO_2$. Because the gold-palladium catalyst 42 may convert CO to $CO_2$ at lower temperatures, the reaction may require less energy, and thus, be more efficient than a gold catalyst.

Increasing $CO_2$ may have the added advantage of requiring less platinum group metal than is typically used to catalyze NOx. Specifically, reducing the concentration of CO in the vicinity of the platinum group metal may reduce the magnitude of CO poisoning of the platinum group metal. Typically, countering CO poisoning of platinum group metal catalysts is achieved by the use of excess platinum group metal, which may be costly. Thus, by reducing the effect of CO poisoning on the platinum group metal, the gold-palladium catalyst 42 may maintain its effectiveness in converting NOx to $NO_2$ within particulate filter 40 without the use of excess costly material.

Due to the increased concentration of $NO_2$ and decreased concentration of CO, lightoff of the particulate matter may be achieved at a temperature of about 165° C., and 90% of the particulate matter may be oxidized at a temperature of about 206° C., which may be within an operating temperature of the engine 11. Because regeneration may be achieved at temperatures within the operating range of the engine 11, i.e. within the temperature range of exhaust from the engine 11, the need for providing external energy in the form of electricity or fuel may be reduced or eliminated, and the efficiency of the regeneration event may be increased.

The exhaust treatment system 16 of the present disclosure may reduce a concentration of CO in an exhaust stream while increasing a concentration of $NO_2$. The resultant exhaust gas may facilitate combustion of hydrocarbon at reduced temperatures, and thus increase the efficiency of particulate filter regeneration. Furthermore, the disclosed exhaust treatment system may reduce the CO poisoning of platinum group metals within the catalyst 42, thereby reducing the cost of the exhaust treatment system.

It will be apparent to those skilled in the art that various modifications and variations can be made to the exhaust treatment system. Other embodiments will be apparent to those skilled in the art from consideration of the specification and practice of the disclosed exhaust treatment system. It is intended that the specification and examples be considered as exemplary only, with a true scope being indicated by the following claims and their equivalents.

What is claimed is:

1. An exhaust treatment device comprising a gold-platinum group metal catalyst configured to increase a concentration of nitrogen dioxide, decrease a concentration of carbon monoxide, and reduce a combustion temperature of hydrocarbon, wherein the catalyst contains between about 0.8 and 1.2% gold, by weight, and contains between about 0.4 and 0.6% palladium, by weight, on a titania support.

2. The exhaust treatment device of claim 1, wherein the catalyst is configured to enable lightoff of carbon monoxide at about 60° C.

3. The exhaust treatment device of claim 1, wherein the catalyst is configured to oxidize nitrogen oxide to form nitrogen dioxide.

4. The exhaust treatment device of claim 1, wherein the catalyst is configured to enable lightoff of hydrocarbon at about 165° C.

5. The exhaust treatment device of claim 1, wherein the catalyst is applied to a particulate filter.

6. The exhaust treatment device of claim 1, wherein the catalyst is applied to a particulate filter, and is configured to enable lightoff of carbon monoxide at about 60° C., to oxidize nitrogen oxide to form nitrogen dioxide, and to enable lightoff of hydrocarbon at about 165° C.

7. The exhaust treatment device of claim 6, wherein the catalyst is configured to oxidize carbon monoxide at a temperature of about 84° C.

8. The exhaust treatment device of claim 6, wherein the catalyst is configured to oxidize hydrocarbon at about 206° C.

9. The exhaust treatment device of claim 1, wherein the catalyst is applied to a particulate filter, and is configured to:
enable lightoff of carbon monoxide at about 60° C.;
oxidize nitrogen oxide to form nitrogen dioxide;
enable lightoff of hydrocarbon at about 165° C.;
oxidize carbon monoxide at a temperature of about 84° C.; and
oxidize hydrocarbon at about 206° C.

10. A low-temperature exhaust treatment device comprising:
a titania support; and
a gold-platinum group metal catalyst disposed on the support which is configured to increase a concentration of nitrogen dioxide, decrease a concentration of carbon monoxide, and reduce a combustion temperature of hydrocarbon,
wherein the catalyst contains between about 0.8 and 1.2% gold, by weight, and contains between about 0.4 and 0.6% palladium, by weight, and
the titania support comprises the balance of the weight.

11. The low-temperature exhaust treatment device of claim 10, wherein the catalyst is applied to a particulate filter, and is configured to:
enable lightoff of carbon monoxide at about 60° C.;
oxidize nitrogen oxide to form nitrogen dioxide;
enable lightoff of hydrocarbon at about 165° C.; and
oxidize carbon monoxide at a temperature of about 84° C.; and oxidize hydrocarbon at about 206° C.

* * * * *